United States Patent
Hopinks et al.

(10) Patent No.: US 6,802,541 B2
(45) Date of Patent: Oct. 12, 2004

(54) COMPONENTS, SYSTEMS AND METHODS FOR FORMING A GASKETLESS SEAL BETWEEN LIKE METAL COMPONENTS IN AN ULTRAHIGH PRESSURE SYSTEM

(75) Inventors: Jordan J. Hopinks, Seattle, WA (US); Olivier L. Tremoulet, Jr., Edmonds, WA (US); Larry G. Pearson, Bonney Lake, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 10/038,507

(22) Filed: Jan. 2, 2002

(65) Prior Publication Data

US 2003/0122376 A1 Jul. 3, 2003

(51) Int. Cl.$^7$ .................................................. F16L 25/00
(52) U.S. Cl. ................................. 285/334.4; 285/334.1
(58) Field of Search ........................... 285/334.1, 334.5, 285/334.4

(56) References Cited

U.S. PATENT DOCUMENTS

| | | | |
|---|---|---|---|
| 3,429,581 A | | 2/1969 | Himmel |
| 4,181,332 A | * | 1/1980 | Neumann ................. 285/334.4 |
| 4,817,962 A | * | 4/1989 | Mott et al. ................... 277/314 |
| 5,002,316 A | | 3/1991 | Chohan |
| 5,120,084 A | * | 6/1992 | Hashimoto ............. 285/133.11 |
| 5,143,410 A | * | 9/1992 | Takikawa .................... 285/197 |
| 5,172,939 A | * | 12/1992 | Hashimoto ..................... 285/24 |
| 5,350,200 A | * | 9/1994 | Peterson et al. ............... 285/92 |
| 5,489,127 A | * | 2/1996 | Anglin et al. ................ 285/328 |
| 5,667,255 A | * | 9/1997 | Kato ........................ 285/133.4 |
| 5,725,259 A | * | 3/1998 | Dials ........................ 285/334.4 |
| 6,045,162 A | * | 4/2000 | Haibara ........................ 285/55 |
| 6,045,165 A | * | 4/2000 | Sugino et al. .............. 385/333 |
| 6,279,965 B1 | * | 8/2001 | Kida ........................... 285/268 |
| 6,312,022 B1 | * | 11/2001 | Brophy et al. .............. 285/268 |

FOREIGN PATENT DOCUMENTS

| | | |
|---|---|---|
| DE | 801602 | 1/1951 |
| GB | 1 344 894 | 1/1974 |

* cited by examiner

*Primary Examiner*—James M. Hewitt
(74) *Attorney, Agent, or Firm*—Seed IP Law Group PLLC (57) ABSTRACT

Components, assemblies and methods for creating seals in ultrahigh pressure fluid containment systems, are shown and described. Embodiments of the invention allow abutting components of like materials to be compressed against each other without the need of an intermediate gasket or other structure, and reduce relative movement between the abutting parts to increase the useful life of the components. Embodiments of the invention incorporate a first component with a tapered mouth having a curved cross-sectional profile, and a complementary component having a mouth with a linear cross-sectional profile. The profiles contact each other at a tangential contact angle ranging between 40 and 68 degrees with respect to the radial axis of the components.

19 Claims, 5 Drawing Sheets

COMPONENTS, SYSTEMS AND METHODS FOR FORMING A GASKETLESS SEAL BETWEEN LIKE METAL COMPONENTS IN AN ULTRAHIGH PRESSURE SYSTEM

BACKGROUND OF THE INVENTION

1. Field of the Invention

The present invention relates to ultrahigh pressure fluid containment systems, and in particular, to components, systems and methods for sealing ultrahigh pressure fluids between components.

2. Description of the Related Art

Figures 1, 1A, 1B:
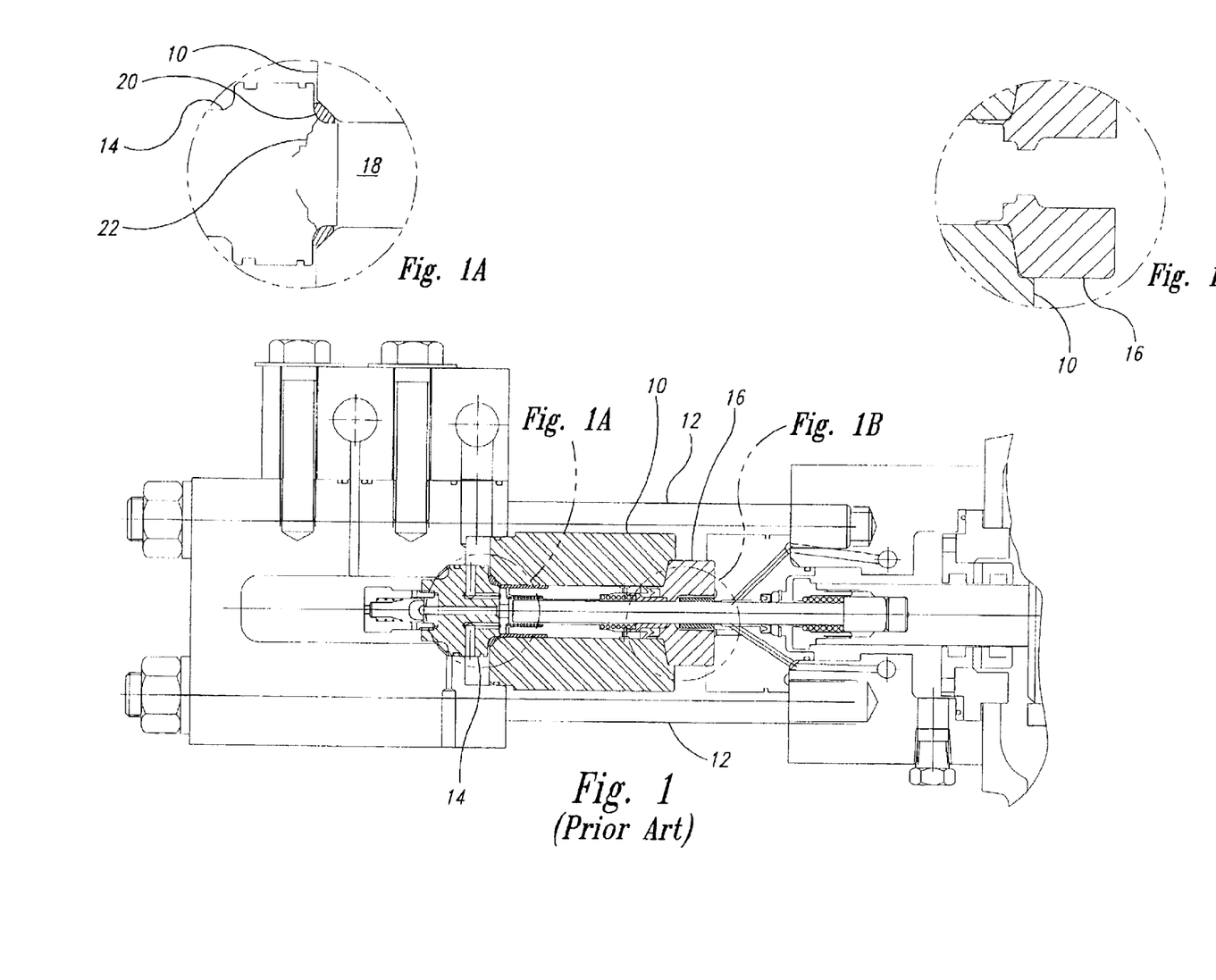
FIG. 1 is a diametric cross-section of an ultrahigh pressure containment system according to the prior art.
FIG. 1a is an exploded portion of the system of FIG. 1.
FIG. 1b is another exploded portion of the system of FIG. 1.

Systems for containing fluids at ultrahigh pressures, such as those in excess of 15,000 psi, can be extremely complicated and subject to failure after an unacceptably short life span. One example of an ultrahigh pressure system is illustrated in FIG. 1, wherein a cylinder 10 is compressed by tie-rods 12 between a check valve 14 and a plug 16. A fluid at an ultrahigh pressure is contained within a cavity 18 (FIG. 1a) that is sealed between the cylinder 10, the check valve 14 and the plug 16. Although various methods have been used to provide a seal for such a configuration, as discussed below, the methods have shown to be insufficient.

As best illustrated in FIG. 1a, an annular seal 20 fabricated from a sacrificial material of lower strength than the cylinder 10 and the check valve 14 is positioned between the two bodies to provide a seal. It has been found, however, that the lower strength seal 20 requires frequent replacement, and that the stresses exerted by the seal result in early failure of the primary complements of the system. Such failures include cracks 22 formed in the bodies adjacent the annular seal 20.

In addition, because materials subjected to extremely high pressures expand, relative motion between the parts results in failure through spalling, galling, or fretting. As best illustrated in FIG. 1b, as the pressure within the cylinder 10 cycles between atmospheric pressure and ultrahigh pressures, the cylinder and the plug 16 expand and contract. It has been discovered that, in the configuration illustrated in FIG. 1b, the cylinder 10 moves at a different rate as compared to plug 16. As a result, during each cycle there is relative movement between the parts. Relative movement between parts of like materials in compression results in spalling, galling and fretting, each of which can damage one or both of the abutting components and shorten the life of the system.

Although this example is illustrated with a drawing of a plug, a cylinder and a check valve, it has been experienced in the industry that similar failures occur at other locations throughout an ultrahigh pressure fluid containment system. Accordingly, the invention discussed below is intended to solve such problems throughout the system.

BRIEF SUMMARY OF THE INVENTION

The present invention is directed toward components, systems and methods for sealing between components in ultrahigh pressure fluid containment systems. Embodiments of the invention allow a complete seal to be formed without a gasket between components of a like material. In addition, embodiments of the invention allow adjacent components to expand and contract without significant relative motion between the components, reducing damage and extending the useful life of the components.

One embodiment of the invention incorporates a pair of adjacent components, one having a tapered female mouth integrally formed thereon for engagement with a complementary tapered male mouth integrally formed on the adjacent component. Each of the mouths has a mating portion. One of the mating portions has a substantially linear cross-sectional profile that is angled between 40 and 68 degrees from a longitudinal axis of the coupling. The other of the mating portions has a convex, curved cross-sectional profile that engages the linear profile of the other component at a substantially circular seal. The system allows components of like materials to be sealingly engaged with each other without the need of a gasket between the components.

Another embodiment of the present invention is directed toward a body having a tapered mouth configured to mate with a complementary mouth on a pressure vessel to form a circular seal therebetween. A contact angle between the adjoining components is tangential to at least one of the components, the tangent measuring between 40 and 60 degrees from a longitudinal axis of the component.

The present invention is also directed toward methods of manufacturing such components.

DETAILED DESCRIPTION OF THE INVENTION

The present invention is directed toward components, systems and methods for creating fluid tight seals without the need for a gasket between components of like materials in an ultrahigh pressure fluid system. Many specific details of certain embodiments of the invention are set forth in the following description, and are illustrated in FIGS. 2–5, to provide a thorough understanding of such embodiments. One skilled in the art, however, will understand that the present invention may have additional embodiments, or may be practiced without several of the details described in the following description.

Figure 2:
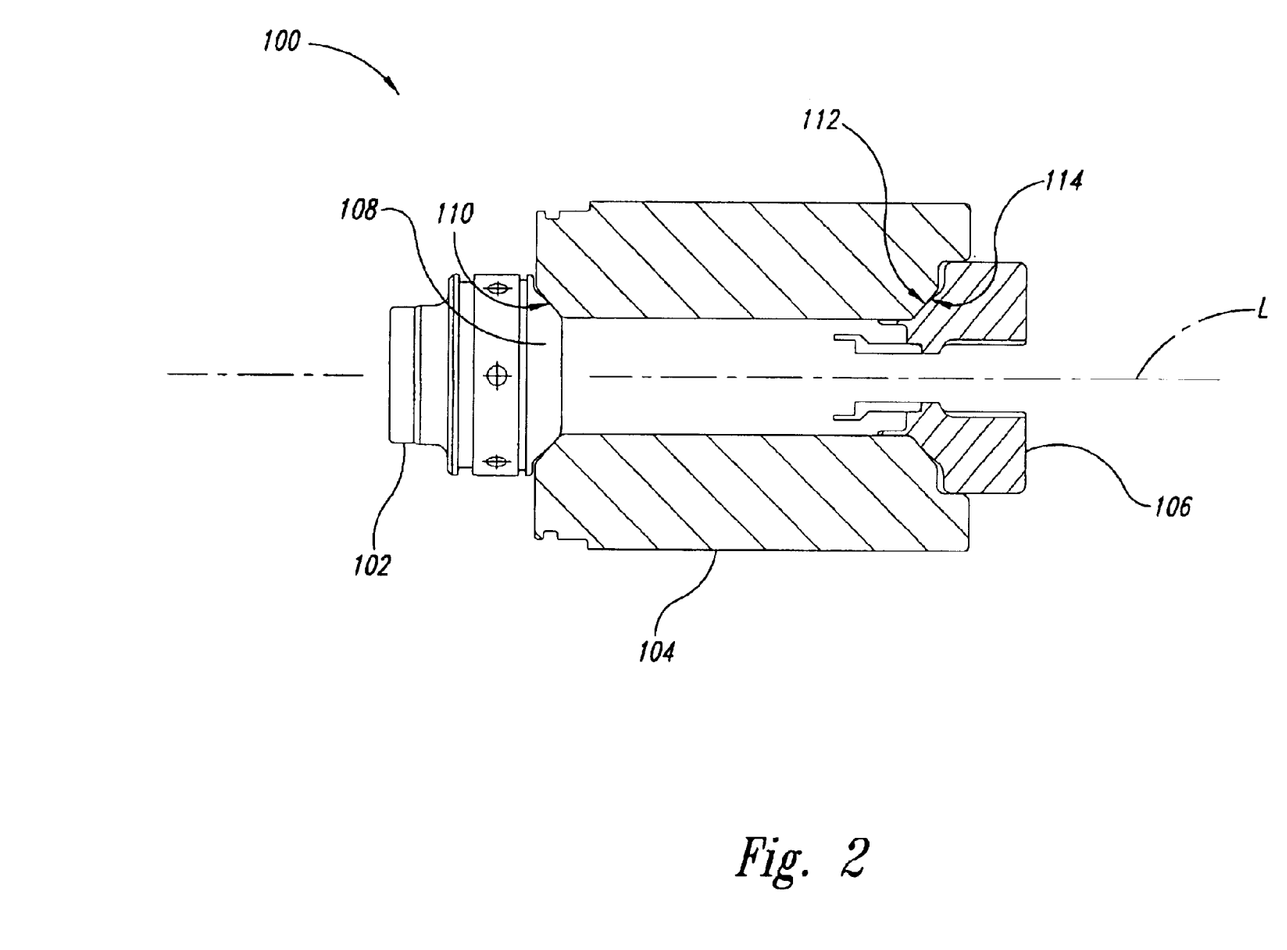
FIG. 2 is a partial cross-sectional view of a pressure containment system according to the present invention.

FIG. 2 illustrates an assembly 100 of components and/or fittings, such as valves and plugs, from an ultrahigh pressure fluid containment system. The illustrated components are a check valve 102, a vessel 104, and a plug 106. Each of the components in the assembly 100 can be manufactured from like materials, such as stainless steel. As described in more detail below, the present invention allows the components to be compressed together to form a fluid seal between adjacent components without the requirement of a gasket. Further, the geometry of the components minimizes relative movement between the components as the pressure within the assembly 100 cycles.

Check valve 102 has an engagement portion 108 that abuts a complementary mouth 110 on the vessel 104. Similarly, the plug 106 has an engagement portion 112 that abuts a complementary mouth 114 on the vessel 104. Tie-rods (not shown) or other structures can be used to compress the check valve 102 and the plug 106 against the vessel 104 to form seals between the respective parts.

In the illustrated embodiment, the engagement portion 108 of the check valve 102, the mouths 110/114 on the vessel 104, and the engagement portion 112 on the plug 106 are all axially symmetric with respect to a longitudinal axis "L" extending along the length of the assembly 100. During operation, the components of the assembly 100 are compressed in the axial direction "L" to form the subject seals.

Figure 3:
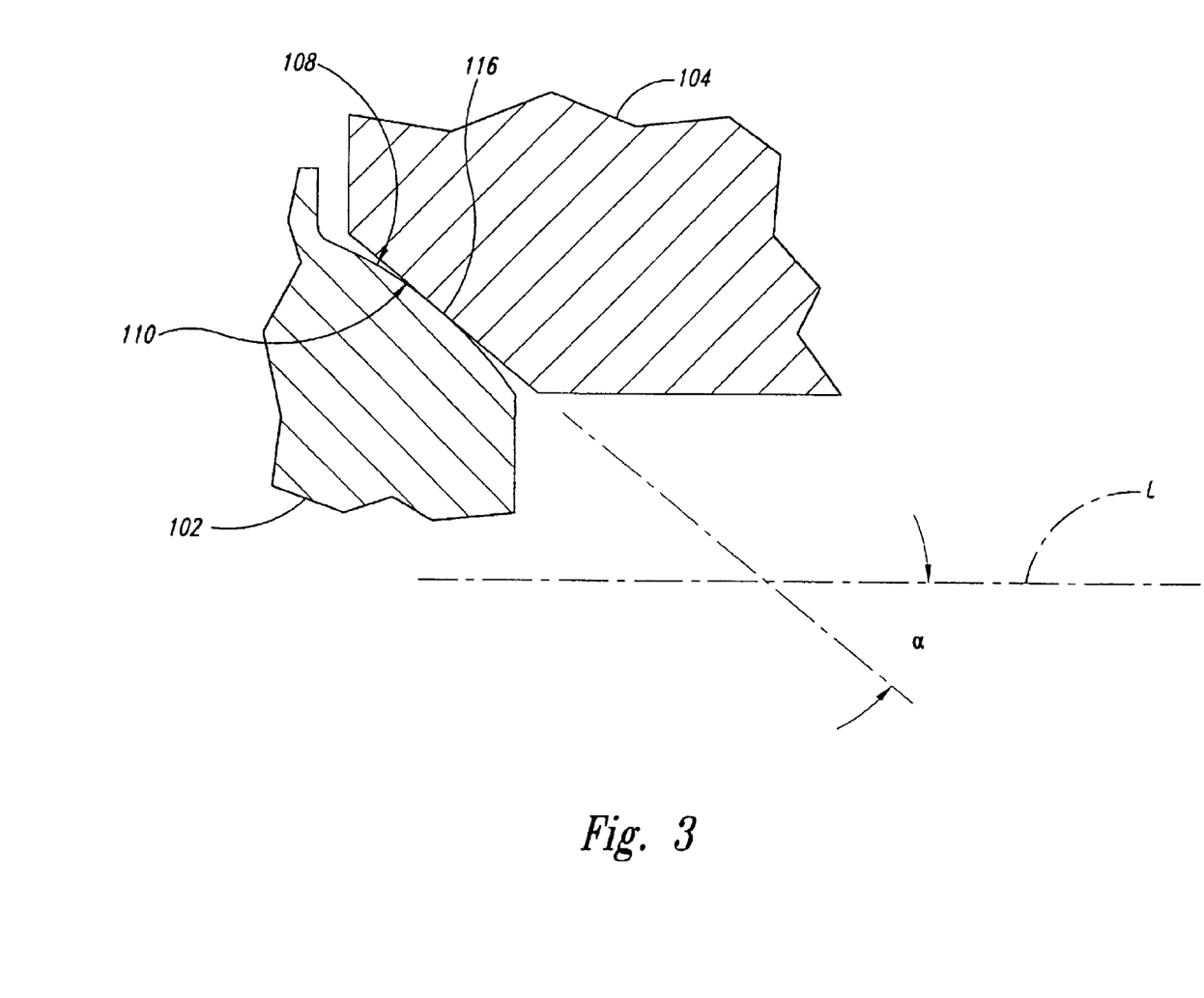
FIG. 3 is a cross-sectional view of a portion of a pressure vessel body and a portion of an abutting component, according to an embodiment of the present invention.

FIG. 3 provides a better illustration of the mate between the check valve 102 and the vessel 104. When viewed in cross section, the engagement portion 108 on the check valve 102 is convexly curved. The curve can be arcuate, elliptical, or of other suitable shapes. The mouth 110 on the vessel 104 that engages the check valve 102 has a substantially linear cross-sectional profile. The bevel of the mouth 110 of the vessel 104 is oriented at an angle "α" with respect to the longitudinal axis "L". Accordingly, a contacting portion 116 of the check valve 102 corresponds to the tangent roughly equal to angle "α" when the check valve is aligned axially with respect to the longitudinal axis "L". The seal between the check valve 102 and the vessel 104 consequently is in the shape of a circle. Depending on the radius of curvature of the cross-sectional profile of the engagement portion 108 of the check valve 102, and depending on the hardness of the material, the circular seal between the check valve and the vessel 104 can form a circle of varying thicknesses.

Figure 4:
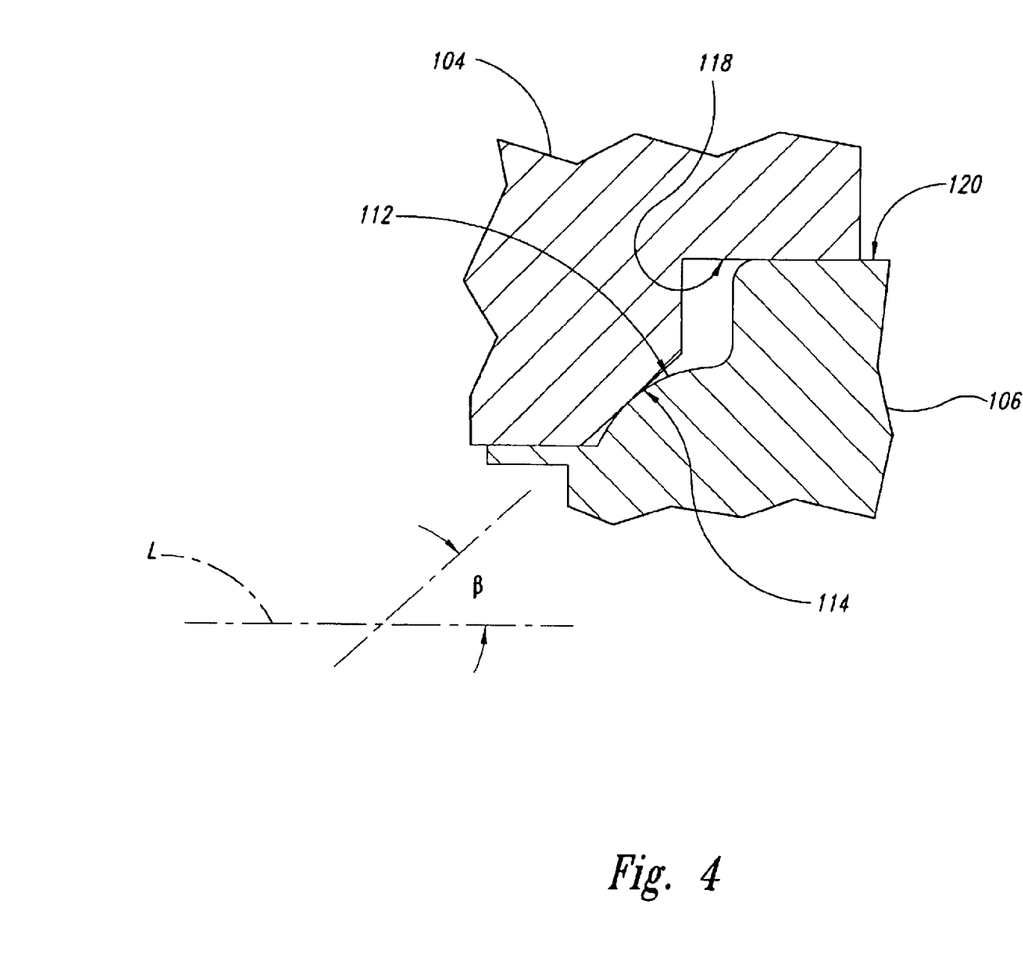
FIG. 4 is a cross-sectional view of a portion of a vessel body and a portion of an abutting component according to an embodiment of the present invention.

Similarly, as best illustrated in FIG. 4, the vessel 104 contacts the plug 106 to form a circular seal between the mouth 114 having a linear cross-sectional profile, and the engagement portion 112 having a curved cross-sectional profile. The linear cross-sectional profile of the mouth 114 of the vessel body 104 is aligned at an angle "β" with respect to the longitudinal axis "L". An inwardly facing alignment surface 118 on the vessel 104 mates with a complementary outwardly facing alignment surface 120 on the plug 106 to retain the plug in the proper alignment with respect to the vessel 104. The inventor appreciates that a wide variety of structures could be used to satisfy this purpose. Likewise, the inventor appreciates that the check valve could have a similar feature without deviating from the spirit of the invention.

Figure 5:
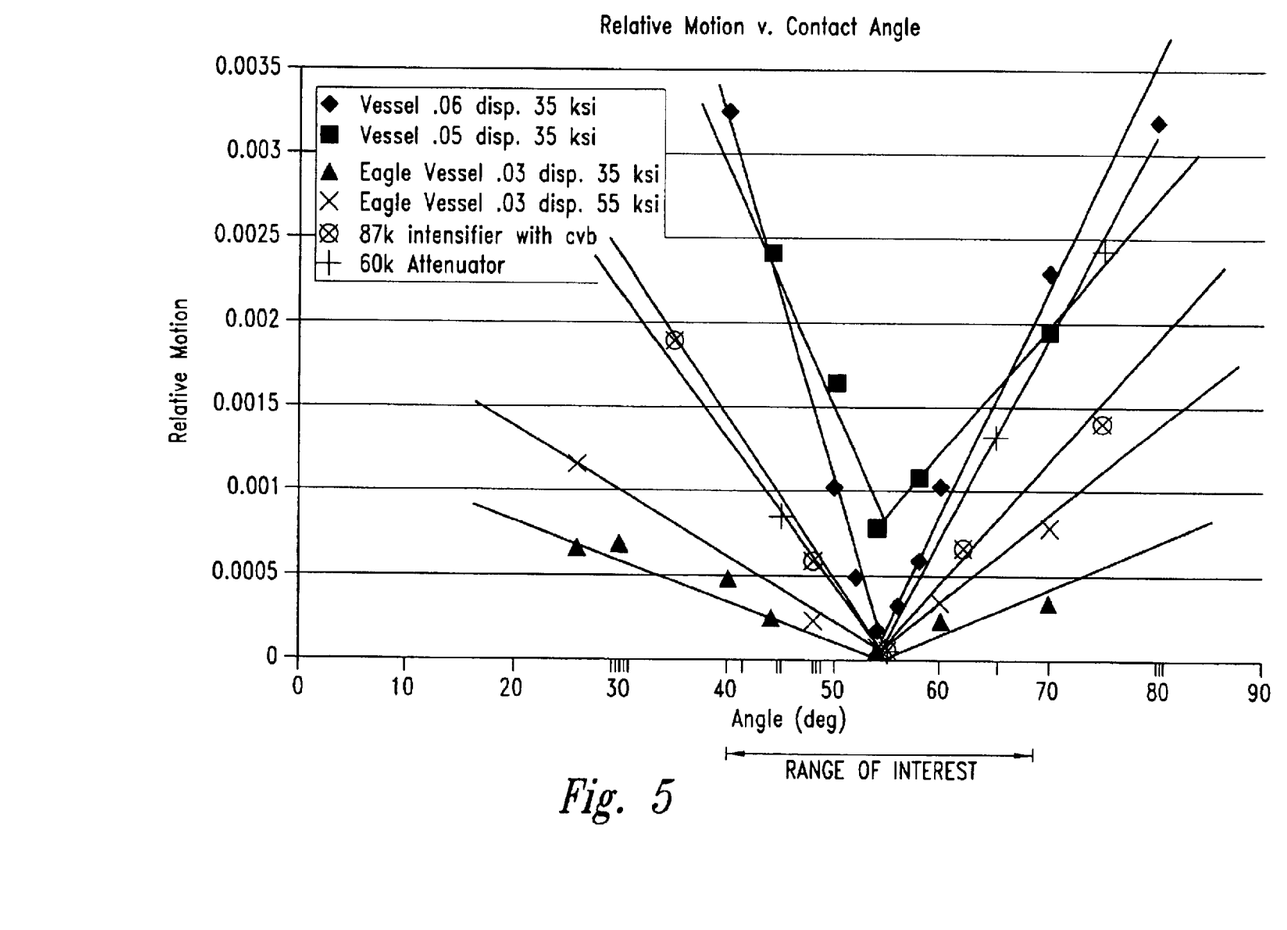
FIG. 5 is a graph illustrating a relationship between the contact angle between the abutting components, on one axis, and the relative motion between the components, on the other axis.

The contact angles α/β between the respective parts of the assembly 100 are designed to minimize relative movement between the respective components. As illustrated in FIG. 5, the contact angles α/β of the present invention are between 40 and 68 degrees, with a preferred range falling between 50 and 59 degrees, and an optimal angle of 54 degrees. The inventors appreciate that, depending on the material used for the components, the contact angles α/β may vary slightly. After reviewing this present disclosure and figures, one of ordinary skill in the art could readily ascertain the optimal contact angles for any given material.

The inventors also appreciate that either or both of the fittings in the illustrated embodiment can have an engagement portion with a linear cross-sectional profile and the vessel have a mouth with a convex, curved cross-sectional profile.

Embodiments of the present invention have numerous advantages over containment systems according to the prior art. The contact angle between the components, and the differing profiles of the adjoining parts (i.e., a curved profile contacting a substantially flat profile), result in little or no relative movement between the abutting components as the pressure in the system cycles. The lack of relative movement eliminates or substantially reduces fretting, spalling and galling, all of which substantially increase the life of the components. In addition, the effectiveness of the seal in the present invention allows the components to be assembled without requiring a gasket or other intermediate structure. The inventors appreciate that such a structure could be inserted between the abutting components. Due to the benefits of the present invention, however, such an insertion is not necessary. Still further, because there is little or no relative motion between the components, components made of like materials can be abutted directly against each other. This is a substantial improvement over prior art systems, in which like materials were avoided for contacting parts due to the historic problem of spalling and other failures.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A pair of adjacent components from a containment system for fluids at pressures in excess of 15,000 psi, providing a seal between the adjacent components without the need for an insert therebetween, the adjacent components being aligned along a coupling axis, the pair of adjacent components comprising:

a tapered female mouth integrally formed on one of the adjacent components, the tapered female mouth having a female mating portion; and a tapered male mouth integrally formed on the other of the adjacent components, the tapered male mouth having a male mating portion sized to contact the female mating portion; wherein:

one of the male and female mating portions has a substantially linear cross-sectional profile, the linear cross-sectional profile being angled between 40 and 68 degrees from the coupling axis; and the other of the male and female mating portions has a convex, curved cross-sectional profile, the curved cross-sectional profile contacting the linear cross-sectional profile in a substantially circular seal, the contact engagement of the male and female portions substantially reducing relative motion between the portions during system operation.

2. The pair of adjacent components of claim 1 wherein the linear cross-sectional profile is on the tapered female mouth and the curved cross-sectional profile is on the tapered male mouth.

3. The pair of adjacent components of claim 1 wherein the linear cross-sectional profile is angled between 50 and 59 degrees from the coupling axis.

4. The pair of adjacent components of claim 1 wherein the linear cross-sectional profile is angled approximately 54 degrees from the coupling axis.

5. The pair of adjacent components of claim 1 wherein the curved cross-sectional profile is substantially arcuately shaped.

6. The pair of adjacent components of claim 1 wherein the curved cross-sectional profile is substantially elliptically shaped.

7. The pair of adjacent components of claim 1 wherein the tapered female mouth is radially symmetric about the coupling axis.

8. The pair of adjacent components of claim 1 wherein the tapered male mouth is radially symmetric about the coupling axis.

9. A fitting for sealing a fluid at a pressure greater than or equal to 15,000 psi between the fitting and a vessel, without requiring an insert therebetween, the vessel having a vessel bore extending along a longitudinal axis, the vessel bore terminating in a tapered mouth for engaging the fitting, the tapered mouth having a linear cross-sectional profile and being radially symmetric about the longitudinal axis and comprising a metallic material for contacting the fitting, the fitting comprising:

a fitting bore extending along a radial axis and terminating in a tapered engagement portion, the tapered engagement portion having a convex, curved cross-sectional profile and being radially symmetric about the radial axis, the tapered engagement portion being sized and shaped to sealingly contact the tapered mouth when the longitudinal axis is aligned with the radial axis and the fitting is urged against the vessel, a contact region between the vessel and the fitting forming a circular seal that is radially symmetric about both the longitudinal axis and the radial axis, the circular seal having a tangential contact angle measuring between 40 and 68 degrees from the longitudinal and radial axes.

10. The fitting of claim 9 wherein the tapered engagement portion has a convex, curved cross-sectional profile for engagement with the tapered mouth having a linear cross-sectional profile, the curved cross-sectional profile being substantially arcuately shaped.

11. The fitting of claim 9 wherein the tapered engagement portion has a convex, curved cross-sectional profile for engagement with the tapered mouth having a linear cross-sectional profile, the curved cross-sectional profile being substantially elliptically shaped.

12. The fitting of claim 9 wherein the contact angle measures between 50 and 59 degrees from the longitudinal and radial axes.

13. A fitting for sealing a fluid at a pressure greater than or equal to 15,000 psi between the fitting and a vessel, without requiring an insert therebetween, the vessel having a vessel bore extending alone a longitudinal axis, the vessel bore terminating in a tapered mouth for engaging the fitting, the tapered mouth being radially symmetric about the longitudinal axis and comprising a metallic material for contacting the fitting, the fitting comprising:

a fitting bore extending along a radial axis and terminating in a tapered engagement portion, the tapered engagement portion being radially symmetric about the radial axis, the tapered engagement portion being sized and shaped to sealingly contact the tapered mouth when the longitudinal axis is aligned with the radial axis and the fitting is urged against the vessel, a contact region between the vessel and the fitting forming a circular seal that is radially symmetric about both the longitudinal axis and the radial axis, the circular seal having a tangential contact angle measuring approximately 54 degrees from the longitudinal and radial axes.

14. A vessel formed of a metallic material for containing a fluid at a pressure greater than or equal to 15,000 psi, the vessel being sealed by a fitting of a metallic material, without requiring an insert therebetween, the fitting having a first tapered engagement portion for engaging the vessel along a coupling axis, the first tapered engagement portion having a convex, curved cross-sectional profile, the vessel comprising:

a second tapered engagement portion shaped to sealingly contact a tapered mouth on the first tapered engagement portion in a circular seal, the second tapered engagement portion having a linear cross-sectional profile, the circular seal having a tangential contact angle measuring between 40 and 68 degrees from the coupling axis; and a device for maintaining the first tapered engagement portion in sealing contact with the second tapered engagement portion such that the engagement, the engagement portion shape, and the contact angle combine to substantially reduce relative motion during operation.

15. The vessel of claim 14 wherein the tangential contact angle is between 50 and 59 degrees from the coupling axis.

16. The vessel of claim 14 wherein the second tapered engagement portion is radially symmetric with respect to the coupling axis.

17. A vessel formed of a metallic material for containing a fluid at a pressure greater than or equal to 15,000 psi, the vessel being sealed by a fitting of a metallic material, without requiring an insert therebetween, the fitting having a first tapered engagement portion for engaging the vessel along a coupling axis, the vessel comprising:

a second tapered engagement portion shaped to sealingly contact a tapered mouth on the first tapered engagement portion in a circular seal, the circular seal having a tangential contact angle measuring approximately 54 degrees from the coupling axis; and a device for maintaining the first tapered engagement portion in sealing contact with the second tapered engagement portion such that the engagement, the engagement portion shape, and the contact angle combine to substantially reduce relative motion during operation.

18. A method for forming a fluid-tight seal in an ultrahigh pressure fluid containment system for containing fluid at a pressure greater than or equal to 15,000 psi, without the need for a gasket or other insert, the method comprising:

providing a first component with a first tapered engagement portion having a linear cross-sectional profile, the first engagement portion being symmetrical about a longitudinal axis of the first component, the linear cross-sectional profile being angled between 40 and 68 degrees from the longitudinal axis;

abutting a second component having a second tapered engagement portion against the first component with the respective tapered engagement portions in contact with each other, the second tapered engagement portion having a curved cross-sectional profile such that the contacting surface between the components is circular having a tangential contact angle measuring between 40 and 68 degrees from the longitudinal axis; and urging the first and second components against each other such that relative motion between the components is substantially reduced.

19. A method for forming a fluid-tight seal in an ultrahigh pressure fluid containment system for containing fluid at a pressure greater than or equal to 15,000 psi, without the need for a gasket or other insert, the method comprising:

providing a first component having a first longitudinal bore and a first tapered engagement portion with a linear cross-sectional profile that is symmetrical about a first longitudinal axis and angled between 40 and 68 degrees therefrom;

providing a second component having a second longitudinal bore and a second tapered engagement portion with a curved cross-sectional profile that is symmetrical about a second longitudinal axis, the second component having material properties substantially similar to those of the first component;

abutting the first component against the second component with their longitudinal axes aligned and their tapered engagement portions in contact with each other, such that the contacting surface between the components is circular; and urging the first and second components against each other to minimize relative motion between the contacting surfaces of the components.

* * * * *

UNITED STATES PATENT AND TRADEMARK OFFICE
CERTIFICATE OF CORRECTION

| | |
|---|---|
| PATENT NO. | : 6,802,541 B2 |
| APPLICATION NO. | : 10/038507 |
| DATED | : October 12, 2004 |
| INVENTOR(S) | : Jordan J. Hopkins et al. |

It is certified that error appears in the above-identified patent and that said Letters Patent is hereby corrected as shown below:

<u>Title Page</u>
Item (75) Inventors, "Jordan J. Hopinks" should read as --Jordan J. Hopkins--

Signed and Sealed this

Thirty-first Day of July, 2007

JON W. DUDAS
*Director of the United States Patent and Trademark Office*